US008879470B2

(12) United States Patent
Zhang et al.

(10) Patent No.: US 8,879,470 B2
(45) Date of Patent: Nov. 4, 2014

(54) COOPERATIVE BEAM FORMING METHOD, APPARATUS AND BASE STATION

(75) Inventors: Bijun Zhang, Shanghai (CN); He Wang, Shanghai (CN); Zhongji Hu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 255 days.

(21) Appl. No.: 13/203,405

(22) PCT Filed: Feb. 27, 2009

(86) PCT No.: PCT/CN2009/000214
§ 371 (c)(1),
(2), (4) Date: Aug. 25, 2011

(87) PCT Pub. No.: WO2010/096952
PCT Pub. Date: Sep. 2, 2010

(65) Prior Publication Data
US 2011/0305164 A1     Dec. 15, 2011

(51) Int. Cl.
H04W 4/00      (2009.01)
H04B 7/02      (2006.01)
H04B 7/06      (2006.01)

(52) U.S. Cl.
CPC .............. *H04B 7/024* (2013.01); *H04B 7/0617* (2013.01); *H04B 7/0639* (2013.01)
USPC ........... 370/328; 370/339; 370/390; 370/432; 370/334; 455/562.1; 455/575.7; 342/154

(58) Field of Classification Search
None
See application file for complete search history.

(56) References Cited

U.S. PATENT DOCUMENTS

| 2007/0140177 | A1 | 6/2007 | Li et al. | |
| 2009/0175214 | A1* | 7/2009 | Sfar et al. | 370/315 |
| 2010/0020702 | A1* | 1/2010 | Wong et al. | 370/252 |
| 2010/0054358 | A1* | 3/2010 | Ko et al. | 375/267 |
| 2010/0069010 | A1* | 3/2010 | Karakayali et al. | 455/63.1 |
| 2011/0081865 | A1* | 4/2011 | Xiao et al. | 455/63.1 |
| 2012/0058788 | A1* | 3/2012 | Papadopoulos et al. | 455/501 |
| 2012/0207093 | A1* | 8/2012 | Li | 370/328 |

FOREIGN PATENT DOCUMENTS

| CN | 101198082 A | 6/2008 |
| CN | 100435492 C | 11/2008 |
| EP | 1933579 A2 | 6/2008 |
| WO | WO2008016280 A2 | 2/2008 |
| WO | 2008019505 A2 | 7/2008 |

OTHER PUBLICATIONS

International Search Report for PCT/CN2009/000214 dated Dec. 10, 2009.
TS 36.420, X2 General Aspects and Principles, 3GPP, Release 8, V8.0.0, Dec. 2007, 11 Pages.

(Continued)

*Primary Examiner* — Robert Wilson
(74) *Attorney, Agent, or Firm* — Fay Sharpe LLP

(57) ABSTRACT

The present invention proposes a method, device and base station for cooperative beam forming based on MBMS fixed grid of beams GoB. The cooperative beam forming method comprises following steps: grouping users into cell central user group and cell edge user group (S701); performing cell central user group multiplexing based on superposition coding (S702); performing cooperative beam forming operation based on fixed grid of beams GoB for cell edge user group (S703).

20 Claims, 7 Drawing Sheets

(56) References Cited

OTHER PUBLICATIONS

IEEE C802.16m-08/487, Grid-Of-Beams (GoB) Based Downlink Multi-User MIMO, IEEE 802.16 Broadband Wireless Access Working Group, May 5, 2008, 4 Pages.

Stankovic et al., Generalized Design of Multi-User MIMO Precoding Matrices, IEEE Transactions on Wireless Communications, vol. 7, No. 3, Mar. 2008, pp. 953-961.

R1-082815, 3GPP TSG-RAN WG RAN1#54, Discussion on Technologies for Further Enhanced MBMS, Alcatel Shanghai Bell, Alcatel-Lucent, Jeju Island, KR, Aug. 18-22, 2008, 11 pp.

R1-082886, 3GPP TSG-RAN WG RAN1 Meeting #54, Inter-Cell Interference Mitigation Through Limited Coordination, Samsung, Jeju, KR, Aug. 18-22, 2008, 9 pp.

European Patent Application 09840620.0, Extended European Search Report, mailed Jun. 5, 2014, 8 pp.

\* cited by examiner

US 8,879,470 B2

COOPERATIVE BEAM FORMING METHOD, APPARATUS AND BASE STATION

FIELD OF THE INVENTION

The present invention relates to multimedia broadcast multicast field, more particularly, to a cooperative beam forming method, apparatus and base station based on fixed grid of beams GoB of MBMS (Multimedia Broadcast Multicast Service).

BACKGROUND OF THE INVENTION

The concept of BF (Beam Forming) derives from smart antenna (SA). The basic principle of SA is that forming a directional beam via process at transmitter using the correlation of channel impulse response of half wavelength-distance antennas array to increase the signal-to-noise ratio (SNR) at receiver and extend coverage area of system. Traditional BF is usually acting on single signal stream, that is, the transmit signal is multiplied with a weight factor and then is transmitted via a plurality of antennas. Normally such gain is called as array gain. Then, the detailed meanings of BF extends with the continuous deeper research of multiple-input and multiple-output (MIMO) system, in which distance of antennas is not limited to half wavelength but may be 4 wavelength/10 wavelength, etc. In these cases, the correlation of channel matrix will weaken largely, and this non-correlation may bring diversity gain, the normal method is STBC (Space Time Block Code); this non-correlation may also bring multiplexing gain, the normal method is v-blast. In this sense, BF has the same meaning as precoding of MIMO, in other words, such BF may be seen as an implementing manner of precoding. The common BF operation manner, such as characteristic root BF, its typical meaning is that BF vector is determined via singular value decomposition (SVD) using the second order statistic information of channel (namely correlation matrix of channel). When single stream is sent, the characteristic vector corresponding to the maximum characteristic value is selected as BF vector; when multiple streams are sent, it is selected in sequence according to the order of size. For MU (Multiple Users)-MIMO, BF may be equal to SDMA (Space Division Multiple Access), wherein BF matrix or precoding matrix needs to maximize SINR signal-to-interference-plus-noise ratio (SINR) of single user, and decreases Interference among users as far as possible, and common algorithms is such as block diagonal (BD) zero forcing algorithms, etc.

In R8 of 3GPP LTE, MBMS has typically been deployed by two scenarios, that is, single-cell (SC) and Multimedia Broadcast Single Frequency Network (MBSFN) transmission. With the evolution of LTE to LTE-A (LTE-Advanced), further enhanced MBMS is required in LTE-A requirement documents namely in TR 36.814 frame according to the conclusion of last Warsaw meeting on Jun. 30-Jul. 4, 2008.

For the SC MUMS transmission, some advanced physical layer technologies, for example, HARQ, link adaptation and multi-antenna techniques, etc. may be used to improve the receiving performance of the UEs with some feedbacks over air interface from terminals (user equipment, UE) to base station (eNB). As one of the improved technologies, a "hybrid scheme" has been proposed in the PCT application for patent for invention with the application number PCT/CN2008/001443, and it may be viewed as the combinations of open-loop transmit diversity, Direction Of Arrival (DoA) based beam forming and the HARQ. Another typical example is to implement beam forming operation based on GoB (Grid of Beams) for SC MBMS as proposed by the PCT application for patent for invention with the application number PCT/CN2008/001441.

Compared with two kinds of existing schemes for SC MBMS, that is, open-loop transmit diversity and max-min beam forming, although obvious performance improvement has been obtained by those enhanced algorithms in the applications for patent for invention with the application numbers PCT/CN2008/001441 and PCT/CN2008/001443, the resulted performance improvement is still limited mainly because all of MBMS users share the same physical time-frequency resources so as to cause that any operation performed on the physical resource is synchronously acting on all of MBMS receiving users. For the reason of random character of users' distribution, when technology such as max-min beam forming is used, while the main beam aims at the worst user, a plurality of other users may probably be located at side lobe of the main beam. This point may be further explained in FIGS. 1 and 2. FIG. 1 shows a schematic diagram of single cell MBMS transmission model. All of interested MBMS users receive MBMS service on the shared physical time-frequency resource as shown in FIG. 1, thus any operation has effect on all MBMS users. The core of two enhanced algorithms in the applications for invention with the application numbers PCT/CN2008/001441 and PCT/CN2008/001443 is the smart usage of beam forming. The normalized average beam patterns under 4 and 8 transmit antennas at eNB are shown in FIG. 2. It is clear from FIG. 2 that the main beam pattern becomes narrower with the increase of antenna numbers. Whenever the above narrow beam is used to aim at some users or user group, other users or user group may be located at side lobe of the main beam so as to incur performance loss due to the scattering of users' distribution within cell, namely random character.

As a result from above analysis, the performance improvement is still limited and more advanced technology is necessary to be investigated.

SUMMARY OF THE INVENTION

In the present invention, a new method is proposed for further performance improvement for SC MBMS: performing cooperative beam forming based on fixed grid of beams GoB, which may further improve the receiving performance of single cell MBMS.

According to the first aspect of the present invention, a cooperative beam forming method is proposed, wherein the method comprises following steps: grouping users into cell central user group and cell edge user group; performing cell central user group multiplexing based on superposition coding; performing cooperative beam forming operation based on fixed grid of beams GoB for cell edge user group.

Preferably, grouping user groups into cell central user group and cell edge user group based on measurement report.

Preferably, the measurement report is reference signal receiving power RSRP or reference signal receiving quality RSRQ.

Preferably, when RSRP or RSRQ measurement value in the measurement report is lower than predetermined threshold value thus the user is put into cell edge user group otherwise the user is put into central user group.

Preferably, the superposition coding method is power allocation superposition coding, constellation rotation superposition coding, transmission rate superposition coding, interleaving superposition coding and different bit rate superposition coding.

Preferably, the cooperative beam forming steps based on GoB comprises:
predefining beam cluster;
determining target sector serving cell edge users;
classifying all of cell edge MBMS users in target sector according to sector cluster of target sector, and forming cell edge MBMS user class corresponding to sector cluster;
for each cell edge MBMS user class,
dividing all of cell edge MBMS users in cell edge MBMS user class into sets, each cell edge MBMS user set having similar PMI measurement value;
target sector sending cooperative request to each sector in sector cluster corresponding to the cell edge MBMS user class, the cooperative request comprises information that which cell edge MBMS user set that one sector in this sector cluster, as cooperative sector, should serve;
target sector forwarding, the common data needed to be transmitted, to each cooperative sector after successfully cooperative negotiation;
all cooperative sectors transmitting data to this cell edge MBMS user class using beam forming operation based on GoB.

Preferably, predefining beam cluster by predefining common codebook in target sector and sectors in sector cluster in which the target sector is located.

Preferably, cell edge MBMS user class corresponding to a sector cluster is nearer to the sector cluster than other sector clusters.

Preferably, all edge MBMS users simultaneously measure PMI measurement values corresponding to target sector and all of sectors in sector cluster of the target sector to obtain optimum PMI of the MBMS user; and the edge MBMS user feeds back the optimum PMI to target sector.

Preferably, obtaining the optimum PMI based on long term SINR calculation.

Preferably, the cooperative request further comprises: information of PMI value application, indicating the cooperative sector the PMI value used during final cooperation.

Preferably, target sector forwards, the common data needed to be transmitted, to each cooperative sector via X2 interface between base stations.

According to another aspect of the present invention, a cooperative beam forming device is proposed, wherein the device comprises: a means for predefining beam cluster; a means for determining sector service, for determining target sector serving cell edge users; a means for classifying sector cluster, for classifying all of cell edge MBMS users in target sector according to sector cluster of target sector, and forming cell edge MBMS user class corresponding to sector cluster; a means for dividing cell edge MBMS user set, for dividing, all of cell edge MBMS users in cell edge MBMS user class, into sets, each cell edge MBMS user set having similar PMI measurement value; a means for sending cooperative request, target sector sends cooperative request to each sector in sector cluster corresponding to the cell edge MBMS user class, the cooperative request comprises information that which cell edge MBMS user set that one sector in this sector cluster, as cooperative sector, should serve; a means for forwarding common data, target sector forwards the common data needed to be transmitted to each cooperative sector after successfully cooperative negotiation; a means for data transmitting of cooperative sectors, all cooperative sectors transmit data to this cell edge MBMS user class using beam forming operation based on GoB.

Preferably, the means for predefining beam cluster predefines beam cluster by predefining common codebook in target sector and sectors in sector cluster in which the target sector is located.

Preferably, determining sector cluster of target sector, so that cell edge MBMS user class corresponding to a sector is nearer to the sector cluster than other sector clusters.

Preferably, all edge MBMS users simultaneously measure PMI measurement values corresponding to target sector and all sectors in sector cluster of the target sector through the means for classifying sector cluster, to obtain optimum PMI of the MBMS user; and the edge MBMS user feeds back the optimum PMI to target sector.

Preferably, the means for classifying sector cluster obtains the optimum PMI based on long term SINR calculation.

Preferably, the cooperative request sent by the means for sending cooperative request comprises: information of PMI value application, indicating the cooperative sector the PMI value used during final cooperation.

Preferably, target sector forwards, the common data needed to be transmitted, to each cooperative sector via X2 interface between base stations.

According to embodiments of the present invention, A base station is proposed, comprising: a grouping unit, for grouping users into cell central user group and cell edge user group; a processing unit for cell central user, for performing cell central user group multiplexing based on superposition coding; the above-mentioned cooperative beam forming device.

Compared with the prior art, the beneficial effects of the present invention are:

1) since all of MBMS user groups receive the same data on the common physical resources, all of cell edge MBMS users m-e may be taken as pure cell edge unicast users. Therefore, the two cooperative mechanisms do not have intrinsical difference.

2) accordingly, some cooperative mechanisms for network/cooperative MIMO are advantageous for cooperative beam forming operation, for example, physical resource coordination in cooperative sectors, reference signal definition for cooperation, etc.

3) however, cooperative beam forming still has some unique feature, for example, user grouping fed back based on PMI (Precoding Matrix Index), etc.

Particularly, the beneficial effects according to the present invention are described in detail as follows:

i) for example, different MBMS user groups are mapped onto different physical resources based on sub-frame level, the different physical resources being different from the previous scheme in which all of MBMS users share the same resources. Therefore, different operations onto different user groups become possible and large performance improvement is anticipated;

ii) for cell central users, superposition coding could be used due to their higher SINRs; for those cell edge users (namely, m-e), network/cooperative MIMO mechanism may be applied, that is, cooperative beam forming based on GoB may be used;

iii) for cell edge unicast user, signaling overhead is similar to network/cooperative MIMO to support this scheme.

BRIEF DESCRIPTION OF THE DRAWINGS

By the detailed description of the non-limiting embodiments with reference to the following drawings, the above and other objects, features and advantages of the present invention will become apparent. In drawings.

DETAILED DESCRIPTION OF EMBODIMENTS

Figure 1:
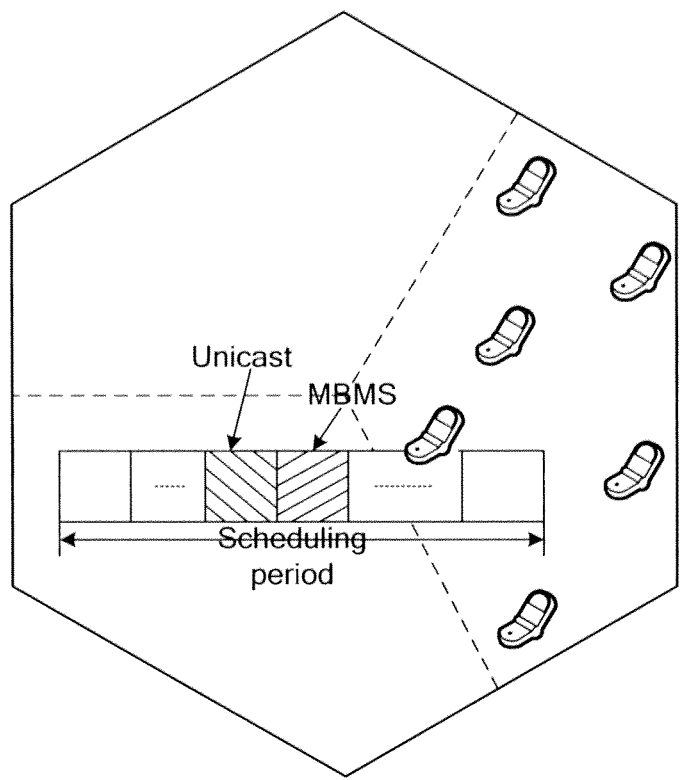
FIG. 1 shows a schematic diagram of single cell MBMS transmission model.
Figure 2:
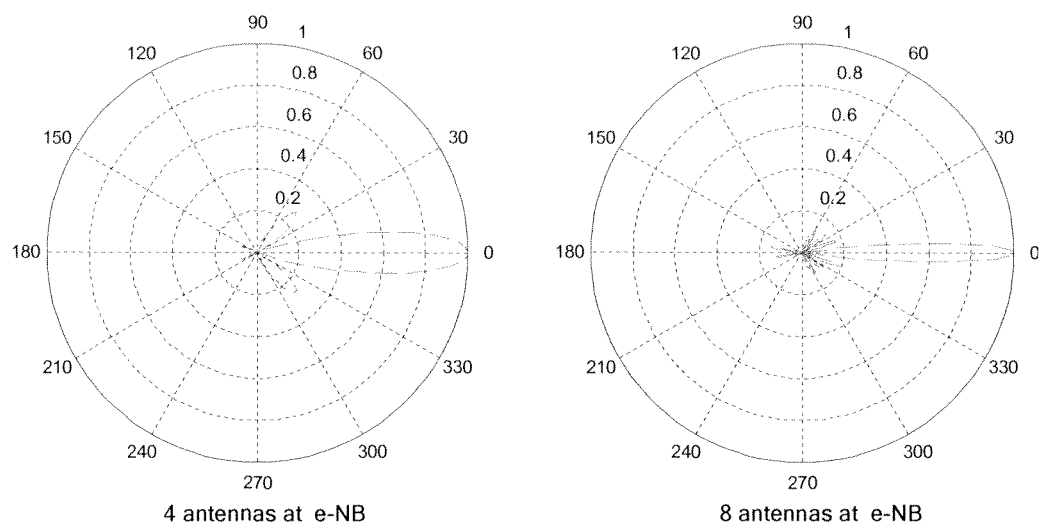
FIG. 2 shows the normalized average beam patterns under 4 and 8 transmit antennas at eNB.

Hereinafter, the present invention is described with reference to the drawings. In the following description, some detailed embodiments are only used for the aim of description, which should not be understood as any limitation to the present invention, but only as examples. When it might cause ambiguous understanding of the present invention, the traditional structure or composition will be omitted.

Before concepts according to the present invention are introduced, firstly all of users (unicast+MBMS) are classified into the following four kinds: ①unicast UE near the eNB, for the purpose of convenience, this kind of user is denoted as "u-c"; ② SC MBMS UE near the eNB, for the purpose of convenience, this kind of user is denoted as "m-c"; ③unicast UE at cell edge, for the purpose of convenience, this kind of user is denoted as "u-e"; ④ SC MBMS UE at cell edge, for the purpose of convenience, this kind of user is denoted as "m-e".

It should be noted that u-c user and m-c user may be the same user, how for the convenience of understanding they may be assumed as different users, and this is suitable for u-e and m-e as well; for u-c and u-e, it is obvious that different data is transmitted to them, but for m-c and m-e, the same data is transmitted to them; here only three kinds of users, that is, u-c user, m-c user and m-e user, are considered. For those u-e users, other hot spot technologies being in discussion such as network/cooperative MIMO may be used.

The key points of concepts of the present invention are: different from the current scheme that all of MBMS users share the same resource based on sub-frame level, in the present invention, different MBMS user groups are mapped onto different physical resources so that operations of different user groups become possible and large performance improvement is anticipated.

The method according to embodiments of the present invention comprises following key steps:

Step 1. how to implement user grouping. For u-c or m-c/m-e users, serving eNB may classify users into different user groups based on measurement report, for example, based on RSRP (reference signal receiving power) and/or RSRQ (reference signal receiving quality). In other words, when measurement value (such as average SINR, RSRQ) is lower than predetermined threshold value, the user is put into cell edge user group otherwise the user is put into central user group.

The predetermined threshold value may be dynamic or semi-static adjusted by the serving eNB according to MBMS user number in the whole cell. According to the present invention, only two kinds of user groups are considered, that is, central user group and cell edge user group.

Step 2. how to operate central user group (u-c+m-c): central user group further comprises u-c users besides m-c users. For this kind of user group, both m-c user and u-c user share the same physical resource. In other words, since central user group has higher SINR, superposition coding via appropriate power allocation or constellation rotation between u-c user and m-c user may be used to multiplex both kinds of users.

Step 3. how to operate cell edge user group (m-e): the cell edge user group only comprises m-e users. For this kind of user group, cooperative beam forming based on GoB similar to network/cooperative MIMO for cell edge unicast users may be defined. Due to the existence of cooperation among several cells, the common physical resources among coordinated cells may be deployed. It is still an open issue on how to configure the needed common physical resources until now but the mechanism similar to network/cooperative MIMO for unicast may be reused here. Since all MBMS users m-e receive the same transmit data on the common physical resources, all MBMS users m-e may be seemed as one cell edge unicast user for case of understanding. As a result, the cooperative beam forming operation based on GoB for m-e users has the similar characteristic with that under discussion CoMP (Cooperative Multi-Port) MIMO technology for cell edge unicast user, so that cooperative beam forming based on GoB according to the method of the present invention may be proposed.

According to the present invention, different from that existing SC MBMS schemes of sharing the same physical resources, user group is considered here and different user groups are mapped onto different resources thus different operation is possible to different user groups. For cell central users, that is, m-c users and u-c users, superposition coding may be used due to their higher SINR. For those cell edge users, that is, m-e, cooperative beam forming based on GoB, similar to network/cooperative MIMO mechanism, may be used.

Figure 3:
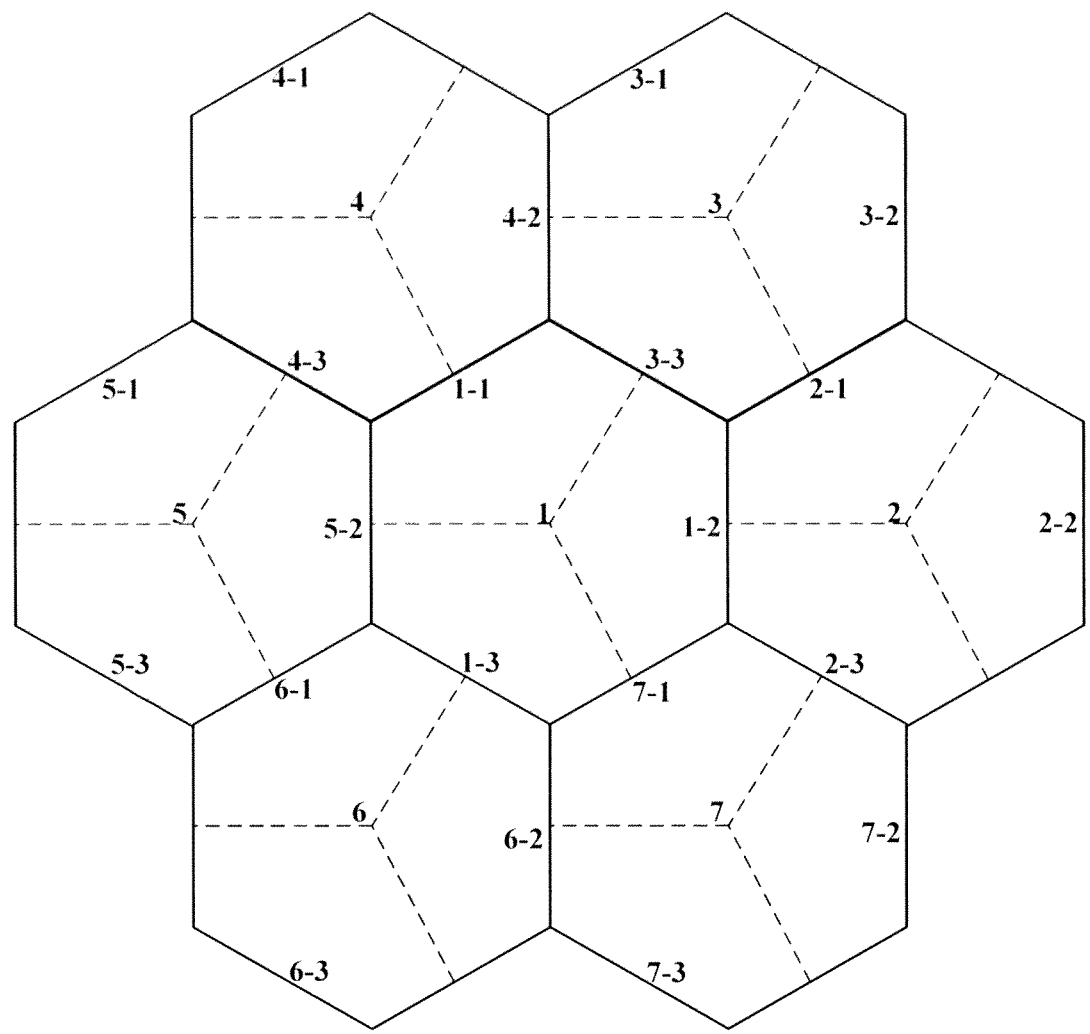
FIG. 3 shows a cell topology using cooperative beam forming method according to embodiments of the present invention.

FIG. 3 shows a cell topology. In FIG. 3, only the central cell and the first tier neighbor cells are considered for simplification. As shown in FIG. 3, cells 1 to 7 are illustrated, in which cell 1 is the central cell and cells 2 to 7 are the first tier neighbor cells. Each cell has three sectors. Here SC MBMS transmission means single-sector transmission with/without neighbor interference coordination.

Figure 4:
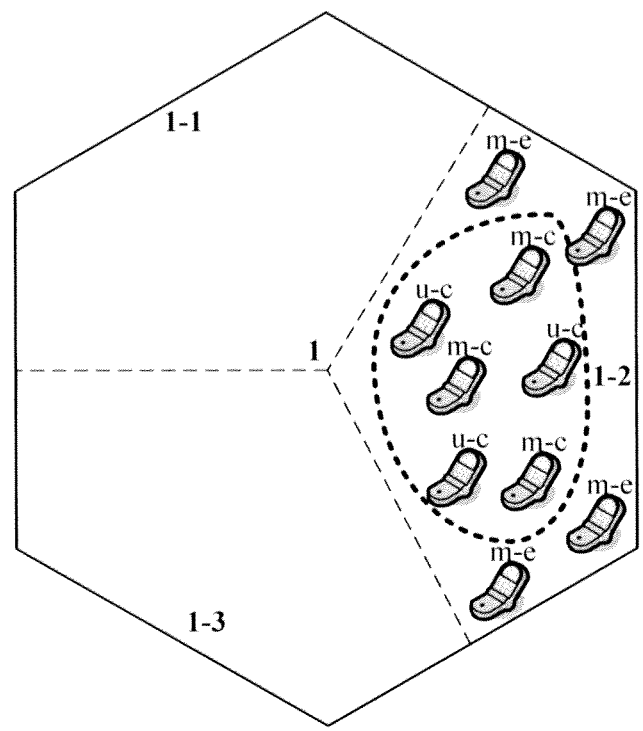
FIG. 4 shows a schematic diagram of user grouping according to embodiments of the present invention.

User grouping is shown in FIG. 4. Here sector 1-2 of the central cell 1 is our interested target sector. All of users (that is, u-c, m-c/m-e) may be classified into two kinds based on the measurement report such as RSRP and/or RSRQ and the pre-determined threshold, as shown in FIG. 4. One kind is cell central users, that is, those u-c and m-c users within the dot line. Another kind is cell edge users, that is, those m-e users outside the dot line. After user grouping, different operations to different user groups become possible.

Figure 5:
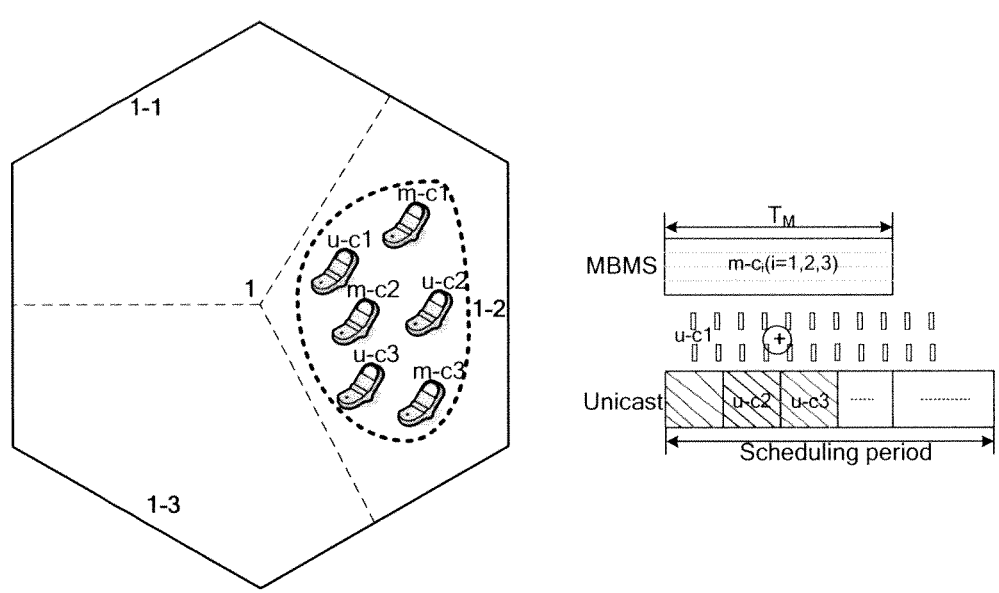
FIG. 5 shows superposition coding for cell central users (u-c and m-c)

Operation on Central User Group (u-c+m-c):

Superposition coding for central users (u-c+m-c) is shown in FIG. 5. Here assuming there are three central unicast users and three MBMS users respectively. The number of central unicast users and the MBMS users is random. From FIG. 5 it may be seen that both u-c and m-c users share the same physical resources via superposition coding. For the superposition coding operation, two typical algorithms, for example, appropriate power allocation or constellation rotation between u-c and m-c may be used to multiplex both kinds of users. During the scheduling period, all central unicast users may be scheduled using PF (Proportional Fair) or RR (Round Robin) algorithms but the time interval parameter $T_M$ for MBMS may be determined by the amount of MBMS content and the configured MCS value.

Figure 6:
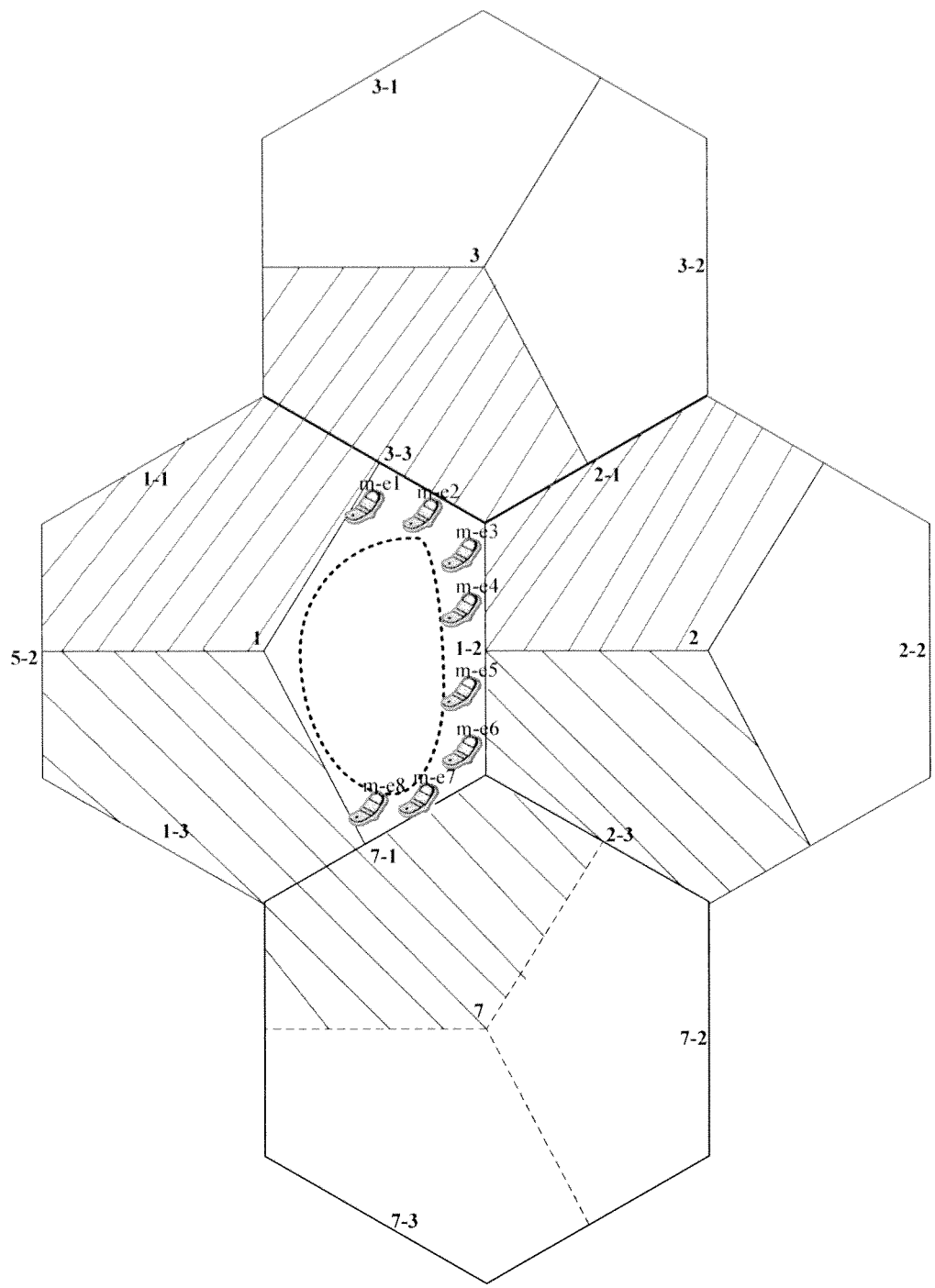
FIG. 6 shows a schematic diagram of cooperative beam forming based on GoB of cell edge user (m-e)

Operation on Cell Edge User Group (m-e):

Cooperative beam forming based on GoB for cell edge users e shown in FIG. 6. Without loss of generality, here assuming there are 8 cell edge MBMS users, that is, from m-e1 to m-e8.

Before the cooperative beam forming is introduced, the communication is in the following state 1) sector 1-2 of the cell 1 is the interested target sector and it has 6 direct neighbor sectors, that is, 1-1, 3-3, 7-1 and 1-3;
2) by using pre-configuration manner, these 6 direct neighbor sectors are divided into two sector clusters, that is, sector cluster-a denoted with left slash including the sector 1-1, the sector 3-3 and the sector 2-1, and cluster-b denoted with right slash including the sector 2-3, the sector 7-1 and the sector 1-3 in FIG. 6;
3) when the target sector is changed, the direct neighbor sectors are also changed and thus both clusters are redefined;
4) when all those cell edge MBMS users (that is, from m-e1 to m-e8) are nearer to cluster-a than cluster-b, cooperation is performed among target sector 1-2 and those sectors within cluster-a. When all those cell edge MBMS users are nearer to cluster-b than cluster-a, cooperation is performed among target sector 1-2 and those sectors within cluster-b. When these two clusters both have cell edge users, cooperation is performed among target sector 1-2 and all of 6 direct neighbor sectors (belonging to cluster-a and cluster-b respectively). The benefit of defining sector cluster is: cooperative signaling may be decreased especially when the number of cell edge MBMS users is small;
5) without loss of generality, only cell edge users m-e1, m-e2, m-e3 and m-e4 are considered here, in other words, only the cooperation between target sector 1-2 and cluster-a is considered.

In this case, the detailed procedure of cooperative beam forming based on GoB is explained as follows:
a) Firstly, the common codebook, that is, grid-of-beams (GoB), is predefined at target sector 1-2 and those sectors within cluster-a.
b) At receivers, all cell edge MBMS users simultaneously measure the measurement value (for example long-term SINR) corresponding to target sector 1-2 and all those sectors in cluster-a so as to obtain the optimum PMI for this user, in other words, that which sector is optimal to serve the edge user is selected and obtained via measurement for this user. This user feeds back the optimum PMI to the target sector at the same time.
c) At target sector 1-2, based on PMI feedback values of all the aforesaid users, all of cell edge MBMS users are classified into a plurality of groups (in this embodiment, since there are only four edge users, these four edge users at most belong to four different groups respectively), wherein each group users have the similar PMI measurement characteristics, for example, PMI difference among users belonging to the same user group is less predetermined threshold–1. Furthermore, when the user classification is performed, PMI difference between different user groups should be kept relative as large as possible (PMI difference of any two users respectively belonging to two user groups is larger than predetermined threshold 2). The maximum user group number is determined by the number of cooperative sectors;
d) after users classification, target sector 1-2 sends cooperative request signaling to each sector in sector cluster-a, the cooperative request signaling comprises:
  i. informing the cooperative sector that which user group should be served by it (for example, the 3rd user group including m-e1, m-e2, m-e3 and m-e5);
  ii. at the same time, informing the cooperative sector of the used PMI value during the final cooperation.
e) after successfully cooperative negotiation, target sector 1-2 forwards, the common data needed to be transmitted, to each cooperative sector in sector cluster-a via X2 interface between base stations.
f) finally, all cooperative sectors transmit data to all of aforesaid cell edge MBMS user groups using beam forming operation based on GoB.

Figure 7:
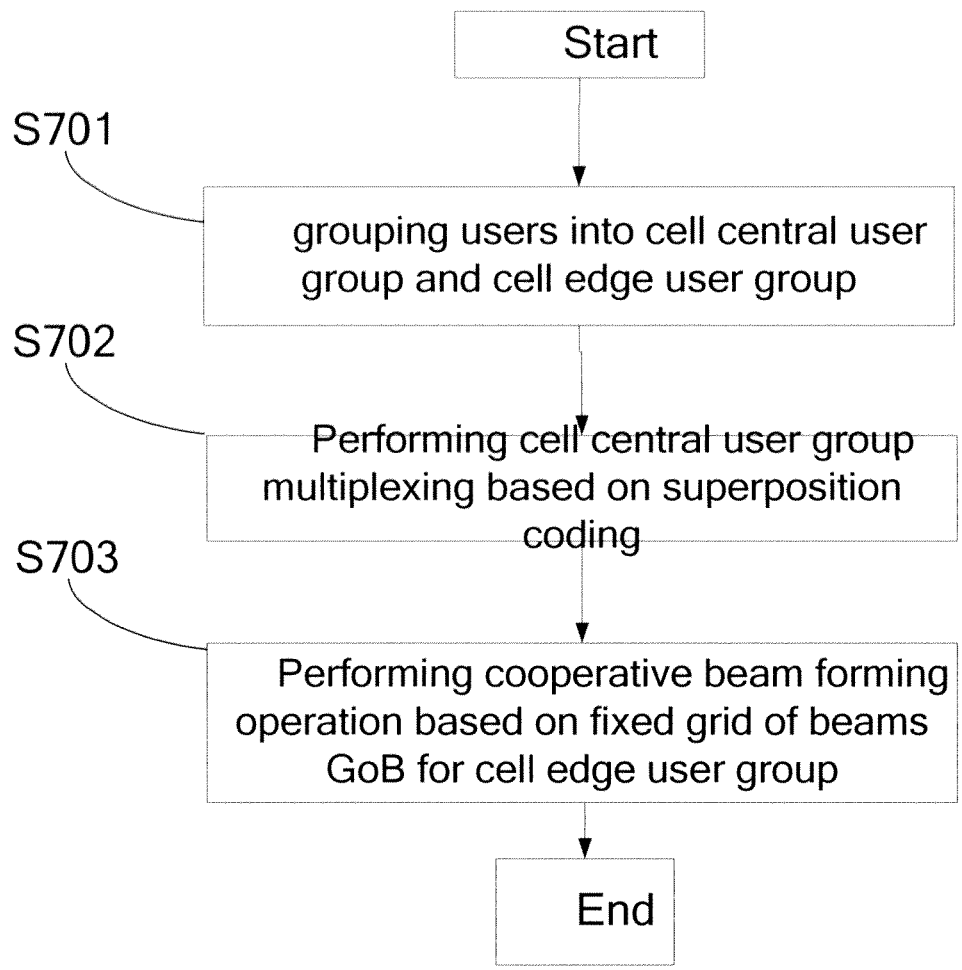
FIG. 7 shows a flowchart of cooperative beaming method according to embodiments of the present invention.

FIG. 7 shows a flowchart of cooperative beam forming method according to embodiments of the present invention. As shown in FIG. 7, the cooperative beam forming method based on MBMS fixed grid of beams comprises the following steps: grouping users into cell central user group and cell edge user group (S701); performing cell central user group multiplexing based on superposition coding; performing cooperative beam forming operation based on GoB for cell edge user group (S703).

In step S701, user groups are classified into cell central user group and cell edge user group based on measurement report, for example, the measurement report may be reference signal receiving power RSRP, reference signal receiving quality RSRQ. When RSRP or RSRQ measurement value in the measurement report is lower than predetermined threshold value, the user is put into cell edge user group; otherwise the user is put into central user group. For example, the measurement value may be SINR measurement value.

In step S702, the superposition coding may be performed by using power allocation, or constellation rotation, interleaving superposition and hit rate superposition. The common superposition coding typically has four kinds: superposition by allocating different powers, by constellation rotation, superposition by different interleaving (for example IDMA), superposition by different bit rates. These superposition methods may be all applied in step S702 according to the present invention. For example, in the step S702, cell central user group may be multiplexed with unicast service users based on superposition coding so as to share the same physical resources.

In step S703, users in cell edge user group is further divided into different sector clusters according to PMI, and at the same time cooperation is performed for cell target sector (each comprises users in a same sector cluster).

Figure 8:
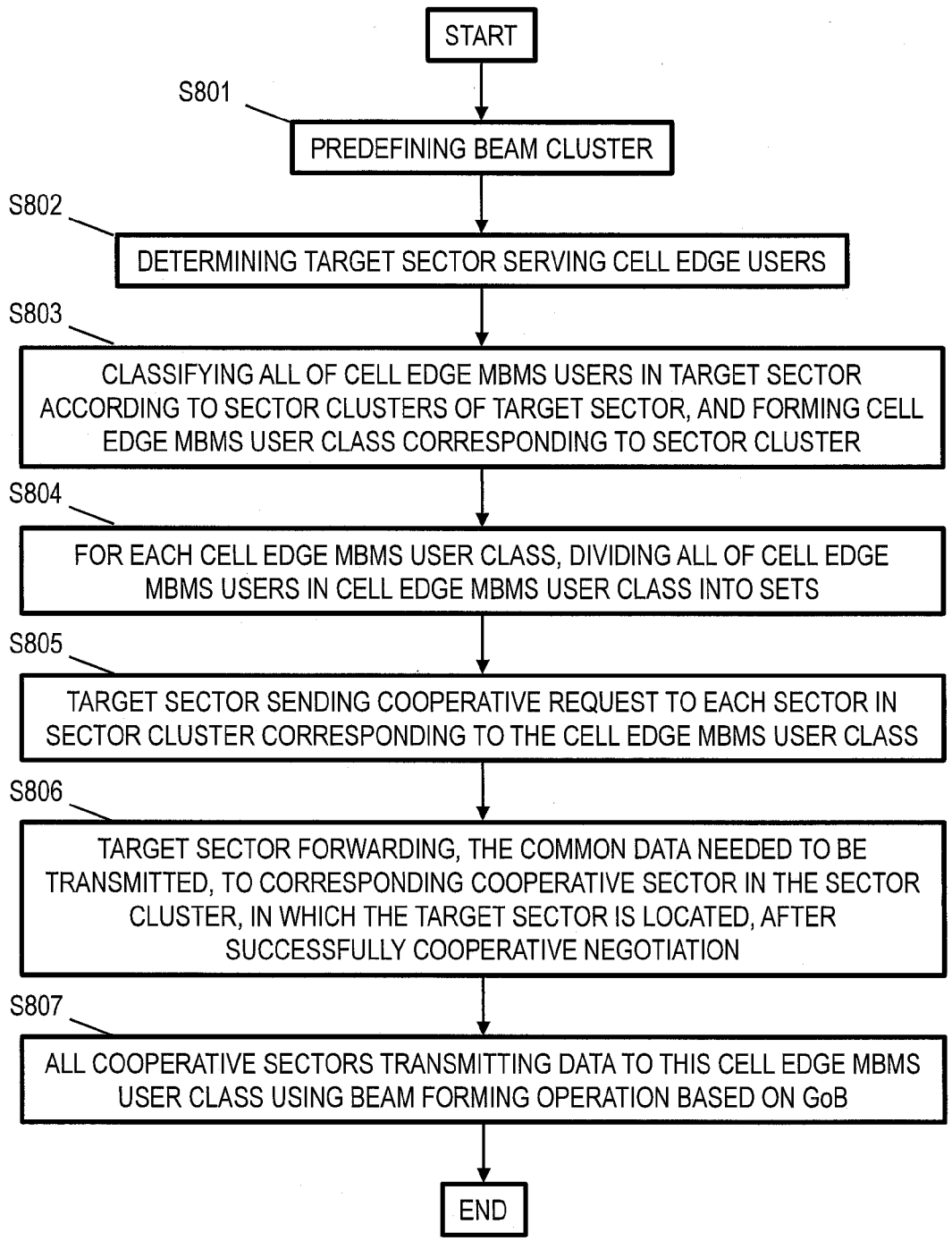
FIG. 8 shows the detailed steps of cooperative beam forming operation based on GoB.

Furthermore, FIG. 8 shows the detailed steps of cooperative beam forming operation based on GoB. As shown in FIG. 8, the steps of cooperative beam forming based on GoB comprises the following sub-steps: predefining beam cluster (S801); at receiver, determining which sector serves cell edge users, that is, determining target sector serving cell edge users (S802); classifying all of cell edge MBMS users in target sector according to sector cluster of target sector, and forming cell edge MBMS user class corresponding to sector cluster (S803); after users classification, for each cell edge MBMS user class, dividing all of cell edge MBMS users in cell edge MBMS user class into sets, each cell edge MBMS user set having similar PMI measurement values (S804); target sector sending cooperative request to each sector in sector cluster corresponding to the cell edge MBMS user class (S805), the cooperative request comprises information that which cell edge MBMS user set that one sector in this sector cluster, as cooperative sector, should serve; target sector forwarding, the common data needed to be transmitted, to each cooperative sector after successfully cooperative negotiation (S806); all cooperative sectors transmitting data to this cell edge MBMS user class using beam forming operation based on GoB (S807).

In the step S801, the process of predefining beam cluster is achieved by predefining common codebook in target sector and sectors in sector cluster in which the target sector is located.

In the step S802, cell edge MBMS user class corresponding to a sector cluster is nearer to the sector cluster than other sector clusters. In other words, all edge MBMS users simultaneously measure PMI measurement values corresponding to target sector 1-2 and all of sectors in sector cluster a in which target sector 1-2 is located, (for example, long term SINR) to obtain optimum PMI of the user; the edge MBMS user feeds back the optimum PMI to target sector 1-2 at the same time. Wherein, in other words, that which sector is optimal to serve the edge user is selected and obtained via user measurement of edge MBMS user.

In step S804, based on PMI feedback values of all the aforesaid users, all of cell edge MBMS users are classified into groups so that each group users have the similar PMI measurement value. When the user classification is performed, PMI difference between different user groups should be kept relative as large as possible. Besides, the maximum user group number is determined by the number of cooperative sectors.

In step S805, the cooperative request comprises: service information, informing the cooperative sector that which user group should be served by it; and information of PMI value application, informing the cooperative sector of the used PMI value during the final cooperation.

In step S806, target sector forwards, the common data needed to be transmitted, to each cooperative sector via X2 interface between base stations.

Figure 9:
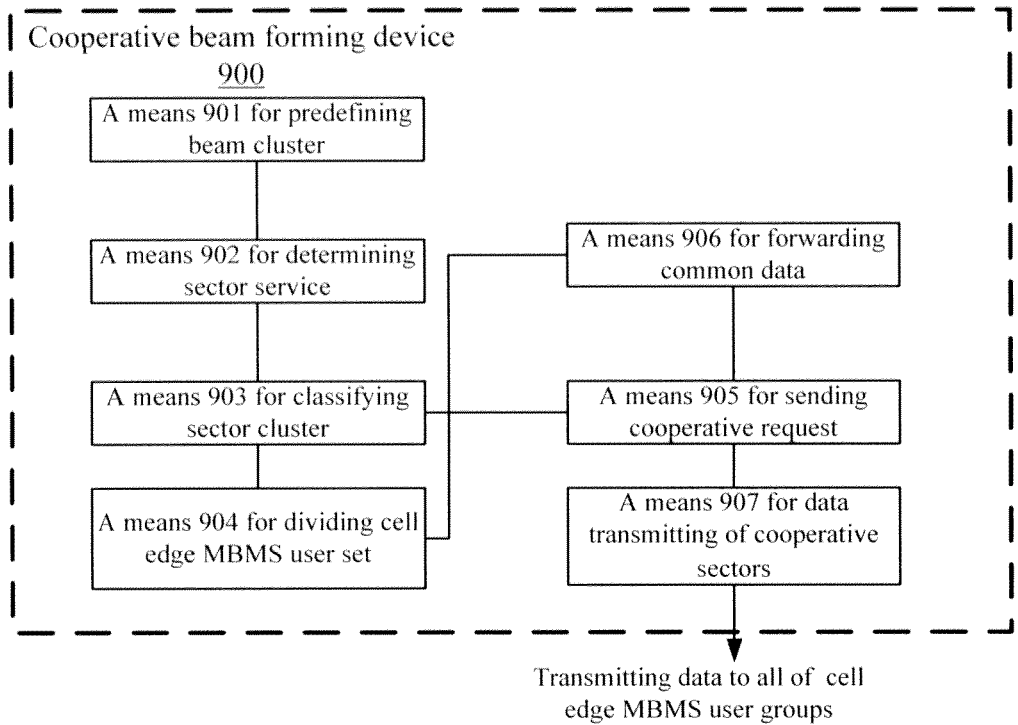
FIG. 9 shows cooperative beam forming device according to embodiments of the present invention.

FIG. 9 shows the detailed structure of cooperative beam forming device 900 according to embodiments of the present invention. The cooperative beam forming device may also comprise the following means: a means 901 for predefining beam cluster; a means 902 for determining sector service, for determining which sector serves cell edge users, that is, for determining target sector serving cell edge users; a means 903 for classifying sector cluster, for classifying all of cell edge MBMS users in target sector into different sector cluster, so that users in each sector cluster have similar predefined matrix index PMI measurement, that is, for classifying all of cell edge MBMS users in target sector according to sector cluster of target sector, and forming cell edge MBMS user class corresponding to sector cluster; a means 904 for dividing cell edge MBMS user set, for dividing, all of cell edge MBMS users in cell edge MBMS user class, into sets, each cell edge MBMS user set having similar PMI measurement value; a means 905 for sending cooperative request, target sector sends cooperative request to each sector in sector cluster corresponding to the cell edge MBMS user class, the cooperative request comprising information that which cell edge MBMS user set that one sector in this sector cluster, as cooperative sector, should serve; a means 906 for forwarding common data, target sector forwards the common data needed to be transmitted to each cooperative sector after successfully cooperative negotiation; a means 907 for data transmitting of cooperative sectors, all cooperative sectors transmit data to this cell edge MBMS user class using beam forming operation based on GoB.

The means for predefining beam cluster predefines beam cluster by predefining common codebook in target sector and sectors in sector cluster in which the target sector is located. While determining sector cluster of target sector, cell edge MBMS user class corresponding to a sector cluster is nearer to the sector cluster than other sector clusters. All edge MBMS users simultaneously measure PMI measurement values corresponding to target sector and all of sectors in sector cluster of the target sector through the means for classifying sector cluster, to obtain optimum PMI of the MBMS user; and the edge MBMS user feeds back the optimum PMI to target sector. The means for classifying sector cluster obtains the optimum PMI based on long term SINR calculation. The cooperative request signaling sent by the means for sending cooperative request comprises the following contents: information of PMI value application, indicating the cooperative sector the PMI value used during final cooperation. Target sector forwards, the common data needed to be transmitted, to each cooperative sector via X2 interface between base stations.

Figure 10:
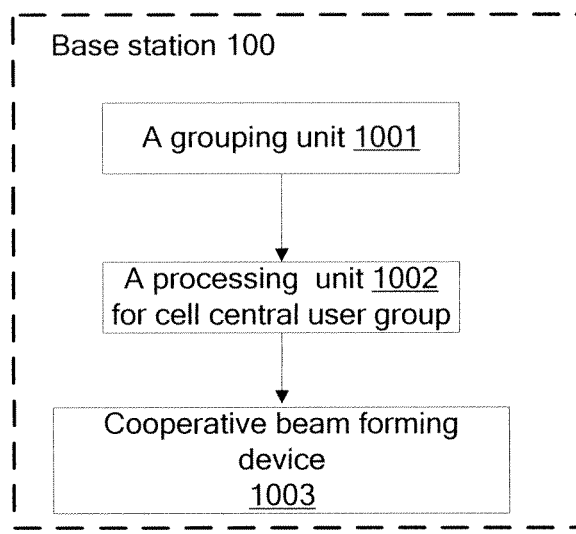
FIG. 10 shows base station structure according to embodiments of the present invention.

FIG. 10 shows a base station 100 according to embodiments of the present invention, comprising: a grouping unit 1001, for grouping users into cell central user group and cell edge user group; a processing unit 1002 for cell central user, for performing cell central user group multiplexing based on superposition coding; the aforesaid cooperative beam forming device 1003.

Since network MIMO mechanism should be defined in 3GPP LTE-A for cell edge unicast users, here the cooperative beam forming based on GoB for cell edge MBMS users has the following characteristics compared with network/cooperative MIMO:

1) since all MBMS user groups receive the same data on the common physical resources, all MBMS users m-e could be seemed as one pure cell edge unicast user. Therefore, both kinds of cooperative mechanisms don't have any intrinsic difference.

2) correspondingly, some cooperative mechanisms used for network/cooperative MIMO are useful for cooperative beam forming operation. For example, physical resources coordination among cooperative sectors, reference signal definition used for cooperation etc.

3) But cooperative beam forming still has some unique characteristics, for example, user grouping based on PMI feedback etc. The beneficial effects according to embodiments of the present invention are summarized as follows: i) for example, based on sub-frame level, different MBMS user groups are mapped onto different physical resources different from the previous scheme in which all MBMS users share the same resources. Therefore, different operations onto different user groups become possible and large performance improvement is anticipated. ii) for cell central users, superposition coding could be used due to those higher SINRs; for those cell edge users (that is, m-e), network/cooperative MIMO mechanism, that is, cooperative beam forming based on GoB may be used. iii) signaling overhead is similar to network/cooperative MIMO for cell edge unicat user to support this scheme.

MBMS performance will be especially enhanced especially for IMT-A which has been determined in the performance requirement of IMT-A. Many companies are considering how to improve the MBMS performance. Compared with both existing schemes for SC MBMS, that is, open-loop transmit diversity and max-min beam forming, although obvious performance improvement has been obtained by the proposed enhanced algorithms, the resulted performance improvement is still limited. The present invention has more attractive characteristics from implementation view. An improved SC MBMS technology is proposed according to embodiments of the present invention, the detailed algorithms program is analyzed, comprising: user grouping, different operations for different user groupings, and the unique characteristics of this method.

The above embodiment is only for an exemplarily purpose and not intended to limit the present invention. The skilled in the art should understand that the present invention may be modified, replaced without departing from the scope and spirit of the present invention, with these modifications and replacements falling within the scope limited by appended claims.

The invention claimed is:

1. A method of performing cooperative beam forming, comprising:
grouping user equipment served by a target sector of a select base station of a cellular communication network into a central user group or an edge user group based at least in part on measurement reports received from the corresponding user equipment;
multiplexing unicast and multimedia broadcast multicast service (MBMS) data in conjunction with serving user equipment in the central user group, wherein the multiplexing is based at least in part on superposition coding; and
configuring common physical resources for cooperative beam forming among the target sector and at least one neighboring sector associated with the select base station or one or more neighboring base station in conjunction with providing MBMS to user equipment in the edge user group, wherein the cooperative beam forming is based at least in part on fixed grid of beams (GoB), wherein each one or more neighboring base station is adjacent to the select base station and each neighboring sector is adjacent to the target sector.

2. The method according to claim 1, wherein the measurement reports include at least one of a reference signal receiving power (RSRP) measurement and a reference signal receiving quality (RSRQ) measurement.

3. The method according to claim 2, wherein, when the measurement value in the measurement report for corresponding user equipment is lower than a predetermined threshold value, the corresponding user equipment is put into the edge user group, otherwise, the corresponding user equipment is put into the central user group.

4. The method according to claim 1, wherein the superposition coding includes at least one of a power allocation superposition coding, a constellation rotation superposition coding, a transmission rate superposition coding, an interleaving superposition coding and a different bit rate superposition coding.

5. The method according to claim 1, wherein a plurality of neighboring sectors that are adjacent to the target sector are divided into a plurality of sector clusters in a predefined manner, the method further comprising:
classifying the user equipment in the edge user group into at least one edge class, each edge class corresponding to a different sector cluster of the plurality of clusters;
dividing the user equipment in each edge class into class sets, the user equipment for each class set of each edge class having similar pre-coding matrix index (PMI) measurement values;
sending a cooperative request to each neighboring sector in each sector cluster with which user equipment is classified, each cooperative request including information identifying which class set the corresponding neighboring sector is to serve as a cooperative sector;
forwarding MBMS data to be transmitted to the user equipment in the edge user group to each cooperative sector after successful cooperative negotiation; and
transmitting the MBMS data from the target sector to the user equipment in the edge user group using cooperative beam forming based at least in part on fixed GoB in conjunction with cooperative transmission of the MBMS data from each cooperative sector to the user equipment in the edge user group.

6. The method according to claim 5, wherein the neighboring sectors are divided into sector clusters based at least in part on predefining a common codebook in the target sector and the neighboring sectors.

7. The method according to claim 5, wherein user equipment in the edge user group is classified into edge classes for different sector clusters based at least in part on the user equipment being nearer to the classified sector cluster than other sector clusters.

8. The method according to claim 5, wherein the user equipment in the edge user group measure PMI for the target sector and neighboring sectors in the sector cluster with which the corresponding user equipment is classified to obtain an optimum PMI for the corresponding user equipment;
wherein the user equipment in the edge user group feeds back the optimum PMI to the target sector.

9. The method according to claim 8, wherein obtaining the optimum PMI is based at least in part on a long term signal-to-interference-plus-noise ratio (SINR) calculation.

10. The method according to claim 5, wherein each cooperative request includes information informing the cooperative sector of the PMI measurement value used during final cooperation.

11. The method according to claim 5, wherein the target sector forwards the MBMS data to at least one cooperative sector via an interface between the select base station and the corresponding neighboring base station.

12. A cooperative beam forming device associated with a select base station in a cellular communication network, the cooperative beam forming device comprising:
an edge class processor configured to classify user equipment in an edge user group for a target sector of the select base station into at least one edge class, each edge class corresponding to a different sector cluster of a plurality of sector clusters, wherein user equipment served by the target sector is grouped into one of a central user group and the edge user group, wherein a plurality of neighboring sectors that are adjacent to the target sector are divided into a plurality of sector clusters in a predefined manner;
a class set processor configured to divide the user equipment in each edge class into class sets, the user equipment for each class set of each edge class having similar pre-coding matrix index (PMI) measurement values;
a sector communication interface module configured to send a cooperative request to each neighboring sector in each sector cluster with which user equipment is classified, each cooperative request including information identifying which class set the corresponding neighboring sector is to serve as a cooperative sector, wherein the sector communication interface is also configured to forward multimedia broadcast multicast service (MBMS) data to be transmitted to the user equipment in the edge user group to each cooperative sector after successful cooperative negotiation; and a transmitter configured to transmit the MBMS data from the target sector to the user equipment in the edge user group using cooperative beam forming based at least in part on fixed GoB in conjunction with cooperative transmission of the MBMS data from each cooperative sector to the user equipment in the edge user group.

13. The cooperative beam forming device according to claim 12, wherein the neighboring sectors are divided into sector clusters based at least in part on predefining a common codebook in the target sector and the neighboring sectors.

14. The cooperative beam forming device according to claim 12, wherein the edge class processor is configured to classify the user equipment in the edge user group into a plurality of edge classes based at least in part on the user equipment being nearer to the classified sector cluster than other sector clusters.

15. The cooperative beam forming device according to claim 12, wherein the cooperative beam forming device is configured to receive an optimum PMI from the user equipment in the edge user group, wherein the optimum PMI is based on the corresponding user equipment measuring PMI for the target sector and neighboring sectors in the sector cluster with which the corresponding user equipment is classified.

16. The cooperative beam forming device according to claim 15, wherein the optimum PMI is based at least in part on a long term signal-to-interference-plus-noise ratio (SINR) calculation.

17. The cooperative beam forming device according to claim 12, wherein each cooperative request includes information informing the cooperative sector of the PMI measurement value used during final cooperation.

18. The cooperative beam forming device according to claim 12, wherein the sector communication interface is configured to forward the MBMS data to at least one cooperative sector via an interface between the select base station and the corresponding neighboring base station.

19. A select base station in a cellular communication network, comprising:
    a grouping unit configured to group user equipment served by a target sector of the select base station into a central user group or an edge user group based at least in part on measurement reports received from the corresponding user equipment;
    a processing unit configured to multiplex unicast and multimedia broadcast multicast service (MBMS) data in conjunction with serving user equipment in the central user group, wherein the multiplexing is based at least in part on superposition coding; and
    a cooperative beam forming device configured to configure common physical resources for cooperative beam forming among the target sector and at least one neighboring sector associated with the select base station or one or more neighboring base station in conjunction with providing MBMS to user equipment in the edge user group, wherein the cooperative beam forming is based at least in part on fixed grid of beams (GoB), wherein each one or more neighboring base station is adjacent to the select base station and each neighboring sector is adjacent to the target sector.

20. The select base station according to claim 19, wherein the cooperative beam forming device is configured to divide a plurality of neighboring sectors that are adjacent to the target sector into a plurality of sector clusters in a predefined manner;
    wherein the cooperative beam forming device is configured to classify the user equipment in the edge user group into at least one edge class, each edge class corresponding to a different sector cluster of the plurality of clusters;
    wherein the cooperative beam forming device is configured to divide the user equipment in each edge class into class sets, the user equipment for each class set of each edge class having similar pre-coding matrix index (PMI) measurement values;
    wherein the cooperative beam forming device is configured to send a cooperative request to each neighboring sector in each sector cluster with which user equipment is classified, each cooperative request including information identifying which class set the corresponding neighboring sector is to serve as a cooperative sector;
    wherein the cooperative beam forming device is configured to forward MBMS data to be transmitted to the user equipment in the edge user group to each cooperative sector after successful cooperative negotiation;
    wherein the cooperative beam forming device is configured to transmit the MBMS data from the target sector to the user equipment in the edge user group using cooperative beam forming based at least in part on fixed GoB in conjunction with cooperative transmission of the MBMS data from each cooperative sector to the user equipment in the edge user group.

* * * * *